Sept. 9, 1958  J. D. FLEMING ET AL  2,851,019
COMBUSTION CHAMBER FOR INTERNAL COMBUSTION ENGINE
Filed June 29, 1956
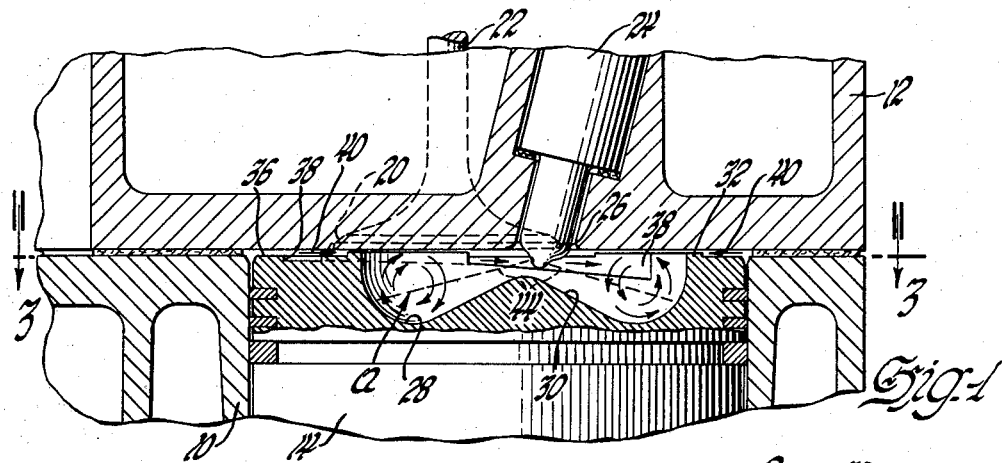
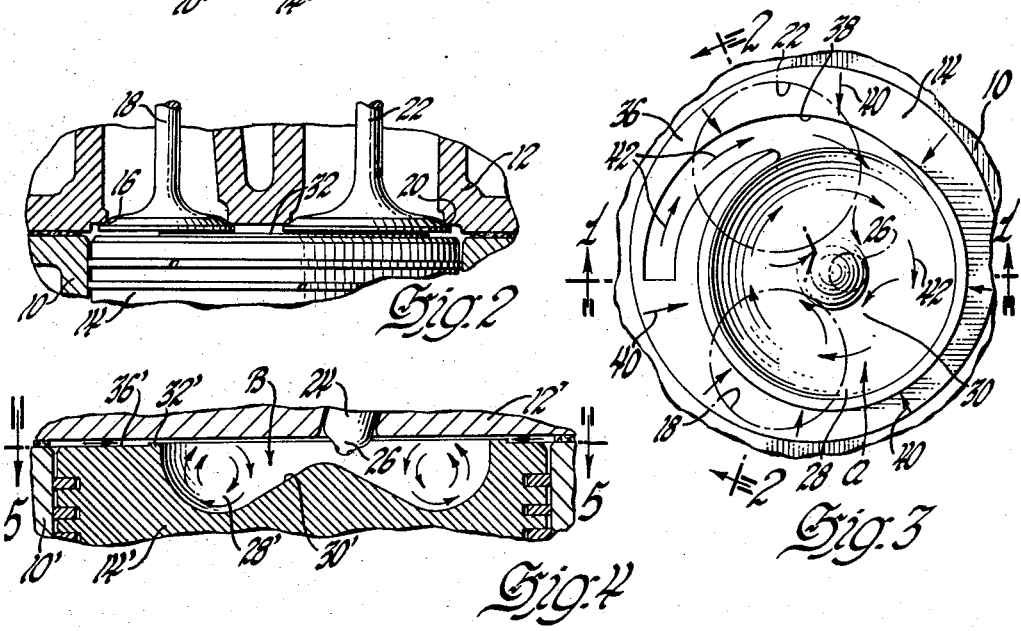
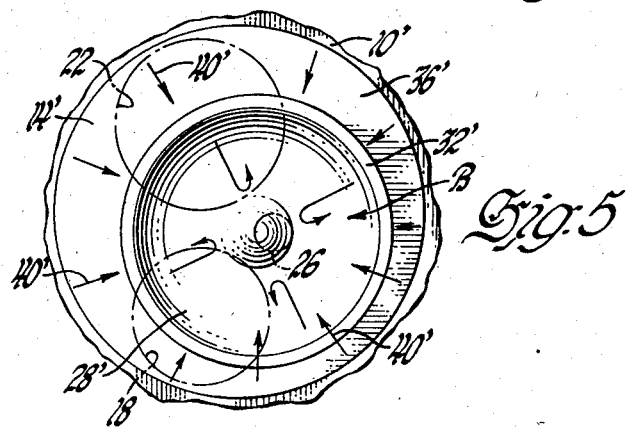
INVENTORS
James D. Fleming &
Henry F. Reinhart
BY
J. C. Thorpe
ATTORNEY

United States Patent Office 2,851,019
Patented Sept. 9, 1958

2,851,019

COMBUSTION CHAMBER FOR INTERNAL COMBUSTION ENGINE

James D. Fleming, Warren, and Henry F. Reinhart, Huntington Woods, Mich., assignors to General Motors Corporation, Detroit, Mich., a corporation of Delaware Application June 29, 1956, Serial No. 594,910

6 Claims. (Cl. 123—32)

This invention relates to an internal combustion engine; more particularly, to an open type combustion chamber for a compression ignition, fuel injection internal combustion engine; and with regard to certain more specific aspects of the invention, to a combustion chamber of the type in which the chamber is, except for a working clearance, formed by a bowl-shaped open cavity wholly within the piston into which fuel is injected near the end of the compression stroke.

Combustion chambers of this type are known as semi-turbulent toroidal chambers and are generally utilized in engines having an air charge induction induced swirl, obtained either by the use of a directed air inlet passage and valve or its equivalent in a four cycle engine, or by the use of tangentially disposed inlet ports in a two cycle engine. This swirl is augmented by the radially inwardly squishing of the air charge which occurs with such a combustion chamber as a portion of the air is trapped in the relatively small clearances between the cylinder head and the annular top surface portions of the piston head surrounding the opened cavity during the final portions of the compression stroke. The utilization of such swirl reduces the ignition delay occurring after fuel injection thereby improving the ignition timing control and permits the economical use of a wider range of fuels with less sensitive fuel injection equipment.

Among the principal objects of the present invention are to provide an improved open type combustion chamber; to provide such a combustion chamber with an improved compression induced action of the air trapped between the annular top portion of the piston surrounding the chamber and the cylinder head; and to provide such an improved combustion chamber which is formed principally within a piston which may be installed in existing engines.

A further object of the invention is to provide such a combustion chamber with improved means for utilizing the portion of the air charge trapped in the relatively small clearances between the annular top portion of the piston surrounding the chamber and the cylinder head to induce the desired air movement in the chamber.

A still further and more specific object of one aspect of the invention is to provide such a combustion chamber with improved means for inducing a swirl in the chamber utilizing a portion of the air charge trapped in the relatively small clearances between the annular top portion of the piston surrounding the chamber and the cylinder head.

The foregoing and other objects, advantages and features of the present invention will be more thoroughly understood from the following detailed description of several preferred embodiments thereof, reference being had to the accompanying drawing in which:

Figure 1 is a sectional view through a portion of an internal combustion engine illustrating a combustion chamber embodying one form of the invention and taken substantially on the line 1—1 of Figure 3;

Figure 2 is a sectional view taken substantially on the line 2—2 of Figure 3;

Figure 3 is a view taken substantially on the line 3—3 of Figure 1 and showing elements of the engine in horizontal elevation;

Figure 4 is a view similar to Figure 1 showing a modified form of the invention; and Figure 5 is a view similar to Figure 3 and taken substantially on the line 5—5 of Figure 4.

Referring more particularly to the drawing, Figure 1 shows the combustion chamber A of a four cycle compression-ignition, fuel injection engine. This combustion chamber is defined by a cylinder 10 which is closed at one end by a cylinder head 12 and a piston 14 which is reciprocably mounted therein. The cylinder head is provided with an exhaust port 16 controlled by an exhaust valve 18 and an air inlet port 20 controlled by an air inlet valve 22. In a two cycle engine, the scavenge inlet ports would be arranged intermediate the ends of the cylinder and would be controllable by the piston and, depending upon the type of scavenging provided, would either have one or more valve controlled exhaust ports in the cylinder head or exhaust ports controllable by the piston in the side walls of the cylinder. A fuel injector 24 mounted in the cylinder head has a multiple hole nozzle tip 26 projecting into the combustion chamber A.

A toroidal cavity or bowl-shaped recess 28 having an upwardly-extending conical central portion 30 is formed in the head or crown of the piston slightly eccentrically of the piston axis, and a ridge 32 separates the recess 28 from the outer annular surface 36 formed on the top of the piston. The surface 36 is of substantial area relative to the total area of the piston and is of progressively increasing radial dimension from one side of the piston to the other about a diametrical plane common to both the piston and the recess due to the eccentricity of the recess 28 from the narrow to the wider portion thereof. In the embodiment of Figures 1 and 2, the surface 36 is recessed as indicated at 38 to provide a spiral ramp or groove of progressively increasing depth opening more or less tangentially into the upper portion of the toroidal chamber A.

With this construction, as the piston approaches the cylinder head a portion of the air charge trapped between the surface 36 and the mating surface of the cylinder head is forced or squished radially inwardly of the combustion chamber, as indicated by the arrows 40. This squishing action produces a toroidal flow of the main air charge within the recess 28. A portion of the air so trapped is also forced to flow through the spiral recess 38, as indicated by the arrows 42, and into the recess 28 where it tends to impart a circular swirl in the main charge.

As the piston 14 further approaches its uppermost position, which is shown in Figure 1, the ridge 32 progressively reduces the clearance through which the entrapped air can move radially inwardly and forces a progressively increasing portion of the remaining air entrapped between the surface 36 and the head through the recess 38 and into the chamber 28. This accelerates the swirl component imparted to the air charge within the recess 28. The fuel is injected into the combustion chamber by the injector 24 just before the piston reaches its uppermost position. The injected fuel is dispersed in the form of a relatively flat cone, indicated by the broken lines at 44, and intersects the swirling and toroidally flowing air charge within the recess 28 to achieve a rapid mixing of the fuel and air charges.

The embodiment of the invention shown in Figures 4 and 5 is similar to that of Figures 1 and 2 except that the spiral recess 38 is omitted. A combustion chamber B is defined between the cylinder 10' and cylinder head 12' and a piston 14′. A toroidal recess 28′ is formed eccentrically of the head of the piston and has an upwardly-extending conical central portion 30′. A ridge 32′ formed circumferentially of the recess 28′ separates the recess from an annular surface portion 36′ of progressively increasing radial dimension formed on the top of the piston.

With the embodiment of Figures 4 and 5, as the piston rapidly approaches its uppermost position, the air charge entrapped between the surface 36′ and the cylinder head 12′ is forced radially inwardly, as indicated by the arrows 40′. Due to the variations in surface area around the recess 28′ and the rapidly decreasing clearance between the head 12′ and the ridge 32′, differentials are achieved in the quantity and the velocity of the air forced into the toroidal chamber around its periphery. The resultant toroidal flow within the recess is faster adjacent the broader portion of the surface 36′ than it is adjacent the narrower portion of the surface 36′ and effects proper mixing of the fuel and air charges.

While the foregoing description and figures have been confined to two specific embodiments of the invention it will be apparent to those skilled in the art that numerous modifications can be made without departing from the spirit and scope of the invention, as defined in the following claims.

We claim:

1. In a compression ignition internal combustion engine, a cylinder closed at one end, a piston reciprocably mounted therein and defining an expansible combustion chamber therebetween, said piston having a toroidal bowl formed therein eccentrically of the axis of said piston, and having a ridge surrounding said bowl and separating said bowl from a substantially flat annular surface portion on the top of said piston, said ridge being of a constant and relatively narrow radial dimension in comparison with the minimum radial dimension of said flat surface portion and being of a shallow axial dimension relative to the axial depth of said bowl.

2. A piston for a compression ignition internal combustion engine adapted to be reciprocably mounted in a cylinder closed at one end and defining a combustion chamber therebetween, said piston including a head portion having a toroidal bowl-shaped recess formed therein eccentrically of the axis of said piston, having a ridge circumferentially surrounding said recess, and having an outer annular surface portion separated from said recess by said ridge, said outer annular surface portion being of progressively increasing radial dimension from one side of the piston to the other relative to a diametrical plane common to both said piston and said recess.

3. In a compression ignition internal combustion engine including a cylinder closed at one end and a piston reciprocably mounted therein, said piston having a toroidal bowl-shaped recess formed therein opening toward the closed end of said cylinder, having a ridge surrounding said recess and separating said recess from an annular surface portion on said piston, and having a spiral recess of progressively increasing depth extending from said annular surface portion and opening substantially tangentially into the upper portion of said toroidal recess.

4. A combustion chamber for a compression ignition internal combustion engine defined between a cylinder closed at one end and a piston reciprocably mounted therein, said piston including a crown portion having a toroidal bowl-shaped recess formed therein eccentrically of the axis of said piston, said recess having an upwardly-extending conical central portion, a ridge surrounding said recess and separating said recess from an annular surface portion on said crown, and a spiral recess of progressively increasing depth formed in said piston crown opposite said eccentricity and opening substantially tangentially into the upper portion of said toroidal recess.

5. In a compression ignition engine, a combustion chamber defined between a cylinder closed at one end and a piston reciprocably mounted therein, said piston having a toroidal bowl-shaped recess formed eccentrically of said piston and providing an annular surface on said piston surrounding said recess and having a spiral recess of progressively increasing depth extending from said annular surface and opening substantially tangentially into said toroidal recess.

6. An expansible combustion chamber for a compression ignition internal combustion engine defined between a cylinder closed at one end and a piston reciprocably mounted therein and having means associated therewith for sequentially introducing air and fuel charges into said combustion chamber, said piston including a crown portion having a toroidal bowl-shaped recess formed therein eccentrically of the axis of said piston, the side walls of said recess being defined by an upwardly-extending outer annular portion and an upwardly-extending central conical portion, said crown having a ridge circumferentially surrounding said toroidal recess and separating said recess from a substantially flat annular surface formed on the outer annular portion of said crown, and said crown having a spiral recess of progressively increasing depth formed in said annular portion opposite said eccentricity and opening substantially tangentially into the upper portion of said toroidal recess, rapid reciprocation of said piston towards the closed end for said cylinder being adapted to squish a portion of the air charge trapped between the annular surface and the closed end of said cylinder radially inwardly into said toroidal recess and being adapted to direct an increasing portion of such trapped air through said spiral recess and into said toroidal recess as the piston approaches its uppermost position.

References Cited in the file of this patent

UNITED STATES PATENTS

| | | |
|---|---|---|
| 1,696,799 | Held | Dec. 25, 1928 |
| 2,191,042 | Ricardo | Feb. 20, 1940 |

FOREIGN PATENTS

| | | |
|---|---|---|
| 689,585 | Great Britain | Apr. 1, 1953 |
| 200,219 | Australia | June 17, 1954 |